United States Patent

Umeda et al.

[11] Patent Number: 6,028,592
[45] Date of Patent: *Feb. 22, 2000

[54] RELATIVE ANGLE DETECTING DEVICE

[75] Inventors: Yuichi Umeda; Junichi Saito, both of Fukushima-ken; Arao Sato, Miyagi-ken, all of Japan

[73] Assignee: Alps Electric Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/498,862

[22] Filed: Jul. 6, 1995

[30] Foreign Application Priority Data

Jul. 6, 1994 [JP] Japan ................................. 6-177513
Oct. 8, 1994 [JP] Japan ................................. 6-305130

[51] Int. Cl.[7] .................................................. G09G 5/08
[52] U.S. Cl. ............................................. 345/156; 345/158
[58] Field of Search .................................. 345/156, 157, 345/158, 169, 163, 161, 167, 180; 348/734; 340/825.72, 825.57; G09G 3/02, 5/08

[56] References Cited

U.S. PATENT DOCUMENTS

| | | | |
|---|---|---|---|
| 4,550,250 | 10/1985 | Mueller et al. | 345/158 |
| 5,045,843 | 9/1991 | Hansen . | |
| 5,302,968 | 4/1994 | Heberle | 345/158 |
| 5,349,460 | 9/1994 | Ogasahara et al. | 345/157 |
| 5,351,096 | 9/1994 | Park | 348/734 |
| 5,627,565 | 5/1997 | Morishita et al. | 345/158 |

*Primary Examiner*—Chanh Nguyen
*Attorney, Agent, or Firm*—Brinks Hofer Gilson & Lione

[57] ABSTRACT

In a relative angle detecting device, plural received light outputs are subjected to time division. Received light detection voltage is shifted by a phase shifter and sampling pulse is formed, and peak detecting means holds peak value of received light output based on the sampling pulse. In a CPU, peak value of each voltage is stored in a memory, and the stored value is operated thereby information regarding relative position between a light source and a light reception element is operated. Utilizing the time division, each received light detection voltage can be processed in the same condition, and the peak value of each received light output can be detected with high precision.

5 Claims, 10 Drawing Sheets

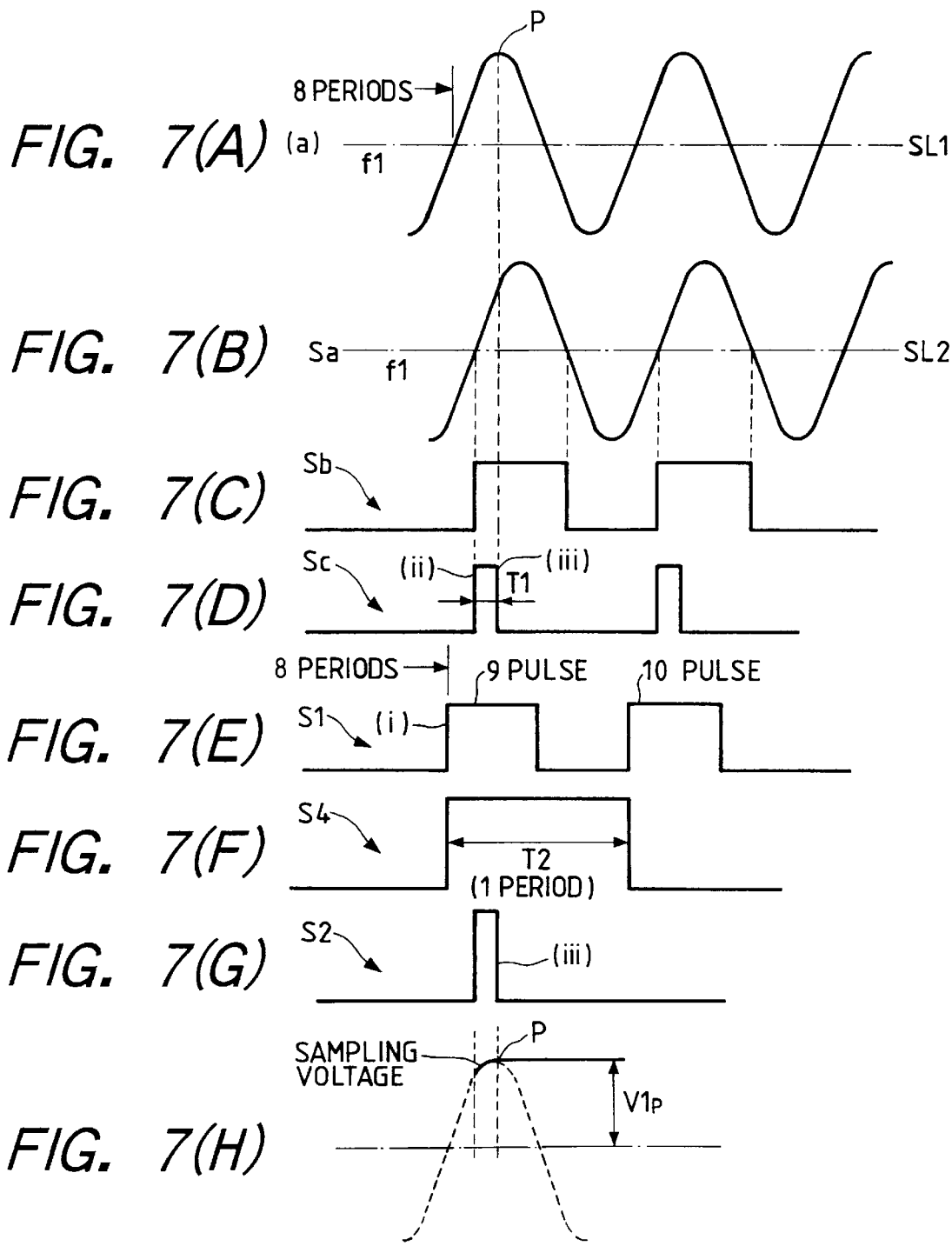

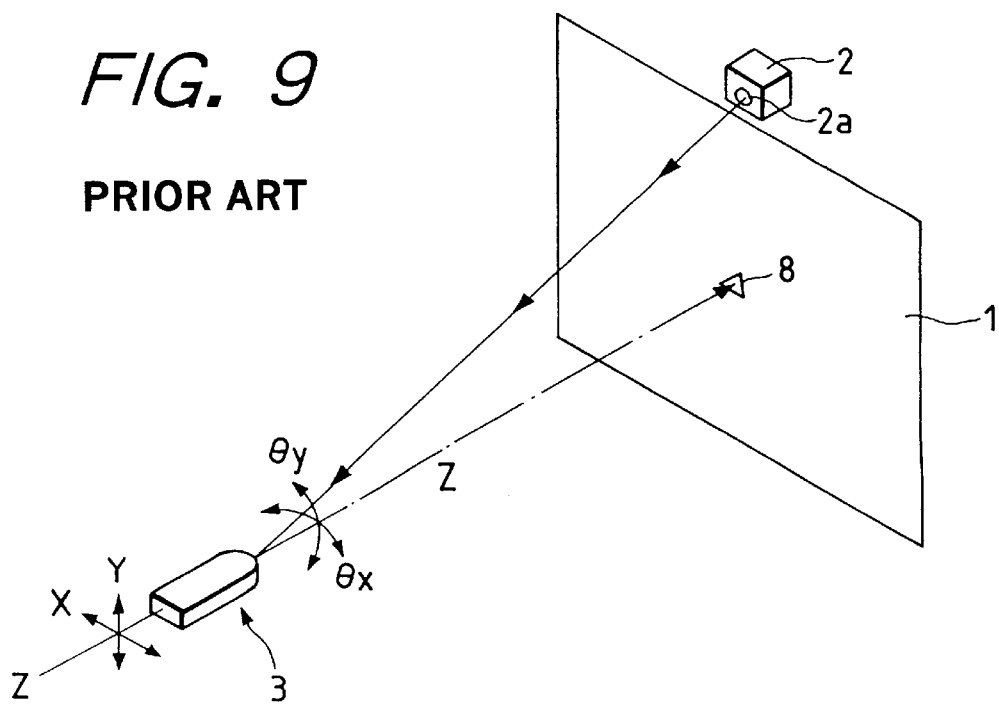
FIG. 9
PRIOR ART
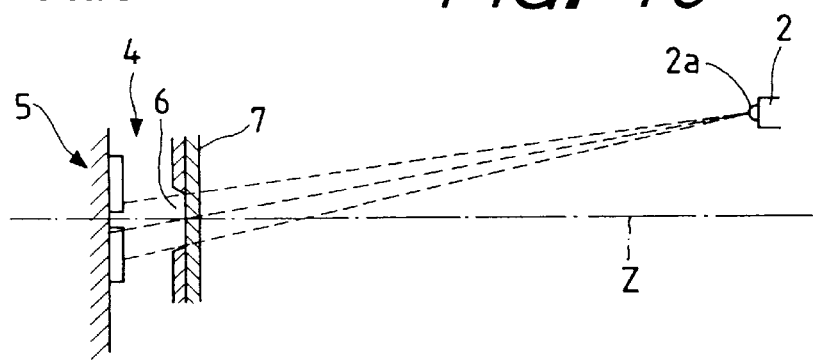
PRIOR ART  FIG. 10
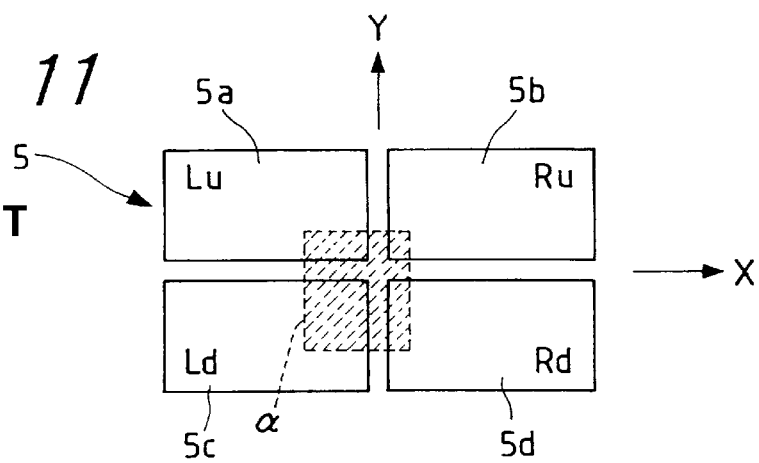
FIG. 11
PRIOR ART

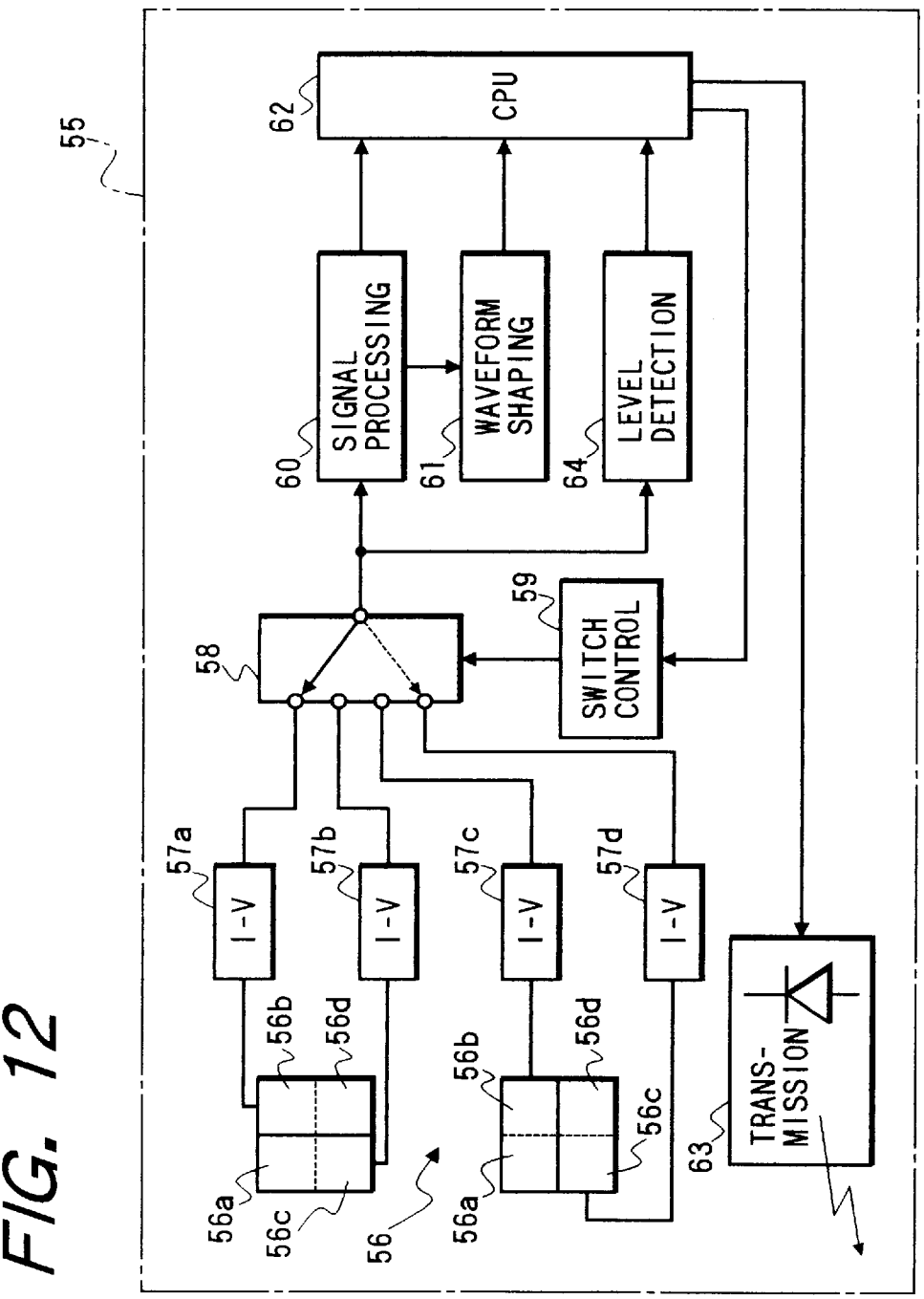
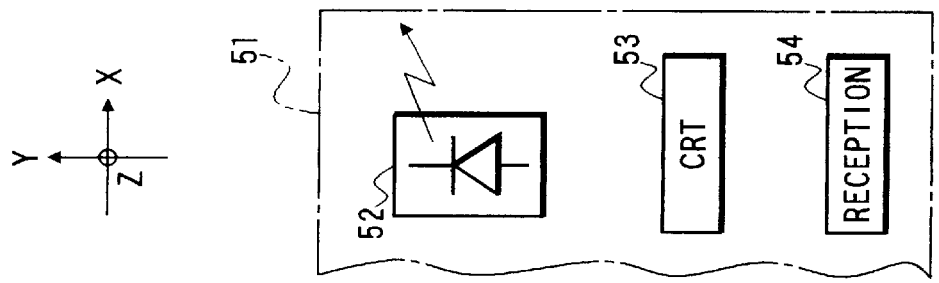
FIG. 12

RELATIVE ANGLE DETECTING DEVICE

BACKGROUND OF THE INVENTION

1. Field of the Invention

The present invention relates to a relative angle detecting device where difference and sum of received light outputs in light receiving sections divided in two or more are operated, and data regarding a relative position between a light source and a light receiving section are operated, and, for example, a relative position between an input device having the light receiving section and a device body such as a computer or a game device, having the light source is detected and the coordinate input or the like to the device body becomes possible.

2. Prior Art

FIG. 9 shows a remote input device as an example of a device using a relative angle detecting device which uses a light source and a light receiving section and detects a relative position between both sections.

In the remote input device, coordinate information or the like can be inputted from an input device 3 to a screen 1 provided on a device body such as a computer or a game device, and configuration of the remote input device is the same as that disclosed in the specification and drawings of JPA 317479/1993.

In FIG. 9, numeral 1 designates a CRT screen provided on a device body, such as a computer, an AV device, a game device or the like. A light emitting device 2 is fixed on the CRT screen 1, and a light source 2a emitting a reference light is installed to the light emitting device 2.

The input device 3 can be moved freely within a space of a position remote from the screen 1, and a detecting section 4 having structure shown in FIG. 10 is installed on the top end of the input device 3. The detecting section 4 is provided with a reception element 5, and a diaphragm 6 and a visible light cut filter 7 are installed in front of the reception element 5.

If the optical axis orthogonal to the aperture center of the diaphragm 6 is assumed as Z-axis, the Z-axis becomes axis directed along the center of the input device 3 towards the front thereof. As shown in FIG. 11, the reception element 5 is constituted by pin photo diodes having light receiving sections 5a, 5b, 5c, 5d divided in four. Taking the X-Y orthogonal coordinates being orthogonal to the Z-axis, set of the light receiving sections 5a, 5b and set of the light receiving sections 5c, 5d are divided in the Y-axis direction, and set of the light receiving sections 5b, 5d and set of the light receiving sections 5a, 5c are divided in the X-axis direction.

The diaphragm 6 has a rectangular aperture, and infrared light emitted from the light source 2a is irradiated as rectangular spot light a to the reception element 5. In respective light receiving sections 5a–5d, a detection current is obtained based on the irradiation area of the spot light α. Provided that detection outputs based on the irradiation area of the spot light α in the light receiving sections 5a–5d are Lu, Ru, Ld, Rd respectively, regarding respective detection outputs, difference of received light outputs in set of the light receiving sections divided in the Y-axis direction and difference of received light outputs in set of the light receiving sections divided in the X-axis direction are operated, thereby inclination in the two-dimensional direction ($\theta x$, $\theta y$) of the Z-axis extending in the front of the input device 3 can be estimated.

Based on the inclination ($\theta x$, $\theta y$), a cursor mark 8 displayed in the vicinity of the intersection to the Z-axis on the screen 1 is moved on the X-Y coordinates, and the moved amount is transmitted as the X-Y coordinate data or as information data of the inclination ($\theta x$, $\theta y$), thereby the information data regarding the direction of the input device 3 with respect to the device body are given to the device body. At the side of the device body, the cursor mark 8 is displayed based on the received data and is moved according to the direction of the input device 3. Also drawing to the screen 1 becomes possible.

In a relative angle detecting device used in the remote input device as above described, difference and sum of the received light outputs Lu, Ru, Ld, Rd by the 4-divided light receiving sections 5a, 5b, 5c, 5d shown in FIG. 11 must be estimated, but for the estimation, received light outputs from the 4-divided light receiving sections must be obtained concurrently. Consequently, in each light receiving section, a processing circuit comprising a current/voltage converter, an amplifier, a band pass filter and the like is required.

When the processing circuit is installed separately in each light receiving section, however, if characteristics of the circuit elements constituting respective processing circuits are not coincident, ratio of the received light outputs in respective light receiving sections cannot be obtained correctly. Consequently, electronic parts are selected and circuit adjustment is carried out so that characteristics of the circuit elements installed in respective light receiving sections are coincident. However, the work therefor becomes very difficult, and as a result, it is impossible that characteristics of the respective processing circuits be coincident completely. Consequently, dispersion of the characteristics of the processing circuits is allowed, and corresponding to this, allowable deviation in parts other than the processing circuit becomes strict and therefore the high precision of the device as a whole is inhibited.

Also in various devices obtaining signals by received light outputs of a reception element, in general, a variable gain amplifier for amplifying received light outputs from the reception element is installed, and auto gain control is carried out in that gain of the variable gain amplifier is controlled in response to the intensity of the received light outputs. However, in a relative angle detecting device which must obtain received light outputs different from each other in the intensity always from the light receiving sections 5a, 5b, 5c, 5d shown in FIG. 11, if the amplification gain is controlled in each processing circuit provided in each light receiving section, ratio of the light receiving area in each light receiving section cannot be grasped correctly. Consequently, the gain must be controlled equally to the received light output from each light receiving section, and the circuit configuration for the gain control of the received light output is complicated inevitably.

SUMMARY OF THE INVENTION

In order to solve the above-mentioned problems in the prior art, an object of the present invention is to provide a relative angle detecting device that a plurality of received light outputs can be processed in processing circuits having the same characteristics, so that ratio of the plurality of received light outputs can be obtained with high precision.

Another object of the present invention is to provide a relative angle detecting device that in time division of a plurality of received light outputs, timing of the time division can be set with high precision using a simple circuit.

Still another object of the present invention is to provide a relative angle detecting device that when light from a light source with the intensity varying in prescribed frequency is received, the peak value of the received light output can be detected in timing with high precision, and also when a plurality of received light outputs are obtained in time division, the peak value can be detected at the stable state of the received light outputs thereby the peak value of the received light outputs can be detected correctly.

A relative angle detecting device according to the present invention comprises a light receiving section for detecting light from a light source, a switch for changing and outputting a plurality of received light outputs in definite period, detecting means for detecting individual received light outputs changed by the switch, and arithmetic means for operating data regarding a relative position between the light source and the light receiving section from the individual received light outputs detected by the detecting means.

For example, the light receiving section is installed at an input device with the direction variable, and a reference light from a light source installed at the device body having a screen is received by the light receiving section, and the received light output from each light receiving section is operated in the arithmetic means thereby information regarding the detection of the input device with respect to the device body can be calculated. The information calculated in the arithmetic means of the input device is supplied to the device body thereby a cursor mark or the like can be displayed on the screen of the device body or the mark can be moved.

In the detecting means as above described, the received light outputs changed by the switch mean both the case that received light outputs led respectively from the light receiving section are changed and the case that a plurality of received light outputs as a result of adding or subtracting any of received light outputs from the light receiving section are changed.

In the above-mentioned configuration, the peak value of the received light outputs is detected in the detecting means, and data regarding the relative position are processed based on the peak value in the arithmetic means.

Or, the peak value and the bottom value of the received light outputs are detected in the detecting means, and operation regarding the relative position is carried out based on the value of difference between the peak value and the bottom value in the arithmetic means.

Also a waveform shaping section for shaping waveform of the received light output and generating the reference signal may be installed, and the reference signal may be counted and the detection timing of the detecting means may be calculated in a CPU, and the received light output may be detected in the detecting means based on the timing command from the CPU.

Also when the detecting means is that other than the CPU, the detected value is supplied through an analog/digital converter to the arithmetic means.

Also the detecting means and the arithmetic means may be included in the CPU, and respective operations may be executed by software.

Also a waveform shaping section for shaping waveform of the received light outputs and switch changing means for counting the reference signal with the waveform shaped and for changing the switch based on the counted value may be installed.

In the above-mentioned configuration, the switch changing means and the arithmetic means may be included in the CPU, and respective operations may be executed by software.

Or, a variable gain amplifier for amplifying the received light outputs may be installed at the stage of the detecting means, and respective received light outputs may be added in the CPU, and based on the added value, gain of the variable gain amplifier may be controlled.

Further, respective received light outputs may be added in the CPU, and based on the added value, the emitted light amount of the light source may be controlled.

Also as a concrete circuit configuration, a phase shifter for shifting phase of individual received light outputs changed by the switch, and a waveform shaping section for shaping the output waveform of the phase shifter into rectangular wave, and a trigger circuit for reducing wavelength of the rectangular wave may be installed, and in the detecting means, the received light outputs at the fall state of the reduced rectangular wave may be held as the detected value.

Or, the relative angle detecting device may be provided with a waveform shaping section for shaping waveform of the received light outputs, a switch changing section for counting the reference signal with the waveform shaped and for changing the switch every time the count number becomes the prescribed number, a phase shifter for shifting phase of the individual received light outputs changed in the switch, a waveform shaping section for shaping the output waveform of the phase shifter into rectangular wave, and a trigger circuit for reducing wavelength of the rectangular wave, where the detection allowance signal may be outputted from the switch changing section when the reference signal becomes the prescribed number after the switch is changed, and in the detecting means, the received light outputs are held as the detected value when the allowance signal is outputted and the rectangular wave reduced in the trigger circuit falls.

Further, the relative angle detecting device of the present invention comprises an information processing device of controlled type and an input device, and the information processing device of controlled type is provided with a light emitting section, a display section and a light receiving section, and the input device is provided with a reception element for receiving light from the light emitting section, a plurality of current/voltage converters for converting an output signal of the reception element into voltage, a changing circuit for selecting output voltages of plural channels obtained in the plurality of current/voltage converters in time division in response to the channel changing signal and for generating the time division output voltage, a signal processing section for processing the time division output voltage and for generating relative angle data, a voltage level detecting section for detecting voltage level of each channel in the time division output voltage, and a control unit for operating and calculating the relative angle data and forming coordinate signals and for transmitting the coordinate signals to the light receiving section, where the control unit is provided with means for supplying the channel changing signal of next time to the changing circuit so that channels are selected in the order of the amount of voltage level of each channel detected in the voltage level detecting section.

In the above-mentioned means, received light outputs led from individual light receiving sections or received light outputs of plural sets obtained as a result of addition or subtraction of respective received light outputs of plural light receiving sections are changed by a switch and outputted in order from the switch in definite period. The individual received light outputs changed in the switch are processed in the common processing circuit. Consequently, ratio of the received light amount in respective light receiving sections can be detected correctly in comparison with that having a separate processing circuit in each received light output. In respective received light outputs changed in the switch, the value detected by the detecting means is held and operation is carried out.

Received light outputs are inputted to the arithmetic means in order in response to the switch changing period. In the arithmetic means, respective received light outputs (the peak value or the peak value and the bottom value) are stored in the internal memory or the external memory, and operation is carried out based on respective stored values. As a result of the operation, data regarding the relative position between the light source and the light receiving section are calculated.

As a result, for example, when the light receiving section is installed at the input device and the light source is installed at the device body having a screen, if the input device is moved on the space, the direction of the input device with respect to the screen of the device body can be operated as data of the inclination angle (θx, θy) or as data on the X-Y coordinates in parallel to the screen. If the operation result is transmitted to the device body by wire telegraphy or radio telegraphy, display on the screen is varied in response to the direction of the input device in the device body. Thereby the moving input of the cursor or the drawing input becomes possible on the screen.

Also added value of the received light outputs before changed in the switch or the received light outputs changed by the switch and passing through the band pass filter are subjected to the waveform shaping. Thereby a reference signal (reference clock) is generated based on received light outputs of light transmitted from the light source in constant frequency with the intensity varying. In the switch changing section or the CPU, the reference signal is counted and a changing signal is generated every time the count number becomes the prescribed number, and the received light output voltage is changed in the timing of the changing signal by the switch. That is, since the reference signal (reference clock) is generated from the received light output, an oscillation circuit for generating separate clock or the like is not required. Also since the switch is changed based on the reference signal, the switch changing grasps the period of the received light output voltage correctly and length of the received light output voltage after changed by the switch is set with high precision.

Further since the detection timing of the received light output from the synchronous circuit or the CPU to the detecting means is commanded based on the reference signal, the received light output (the peak value or the peak value and the bottom value) is detected with high precision.

Also when a variable gain amplifier for amplifying the received light output is installed at the front stage of the detecting means, stored values of the respective received light outputs are added and gain of the variable gain amplifier is controlled by the added result in the arithmetic means. The stored values are added and the gain is controlled, thereby the gain control corresponding to the total sum of respective received light outputs in the time division by the switch becomes possible.

Also the timing of detecting the values of the received light outputs by the detecting means can be set as follows. At first, phase of individual received light outputs changed by the switch is shifted by the phase shifter, and the output waveform after the phase shifting is shaped into rectangular wave by the waveform shaping section. Then wavelength with the rectangular wave being at high level is reduced by the trigger circuit, and the fall time is fitted to the peak time of the received light outputs. Thereby the peak value can be detected with respect to the phase of the received light output itself with high precision.

Also in the switch changing section, when the reference signal with respect to the time of the switch changing becomes prescribed number, the allowance signal of detection is generated. The allowance signal is rectangular wave with length corresponding to one period of the reference signal, for example, with respect to the rise of the reference signal at the n periods (n: integer) after the switch is changed. For example, a synchronous circuit is installed, and the AND operation between rectangular wave with length corresponding to one period of the reference signal and short rectangular wave passing through the trigger circuit is carried out in the synchronous circuit, and as a result, the timing pulse of the peak detecting is generated. In the detecting means, the received light outputs are sampled at the rise time of the timing pulse, and the received light outputs at the fall time are held as the peak value.

Further, in the detecting means, the voltage level detecting section detects the voltage level of each channel of the time division output voltage obtained at the selection time of the preceding channel and supplies the detected voltage level to a control unit, and the control unit compares amount of the voltage level of each channel detected in the voltage level detecting section and supplies the succeeding channel changing signal to the changing circuit so that channels are selected in the order of amount of the voltage level at next time.

Thus at the channel selecting time, since the voltage level of each channel is selected in the order of amount of the voltage level obtained previously, such state is prevented that the voltage level of the channel changed and selected at first is too small or the voltage level of the channel is nearly zero, and such state can be avoided that the timing in the A/D conversion of the time division output voltage is shifted and the decision of the channel voltage and the noise voltage becomes difficult, thereby the relative angle data outputted from the signal processing unit always becomes correct.

The above and further objects and novel features of the invention will more fully appear from the following detailed description when the same is read in connection with the accompanying drawings. It is to be expressly understood, however, that the drawings are for purpose of illustration only and are not intended as a definition of the limits of the invention.

BRIEF DESCRIPTION OF THE DRAWINGS

FIG. 7(A)–(H) is a waveform chart showing sample/hold operation of peak value in peak detecting means;

FIG. 9 is an appearance perspective view of a remote input device using a relative angle detecting device of the invention;

FIG. 10 is a sectional view showing a part of the input device shown in FIG. 9;

FIG. 11 is a front view of 4-divided light receiving sections of the input device; and FIG. 12 is a block configuration diagram showing a relative angle detecting device in the sixth embodiment of the invention.

DESCRIPTION OF THE PREFERRED EMBODIMENTS

Figure 1:
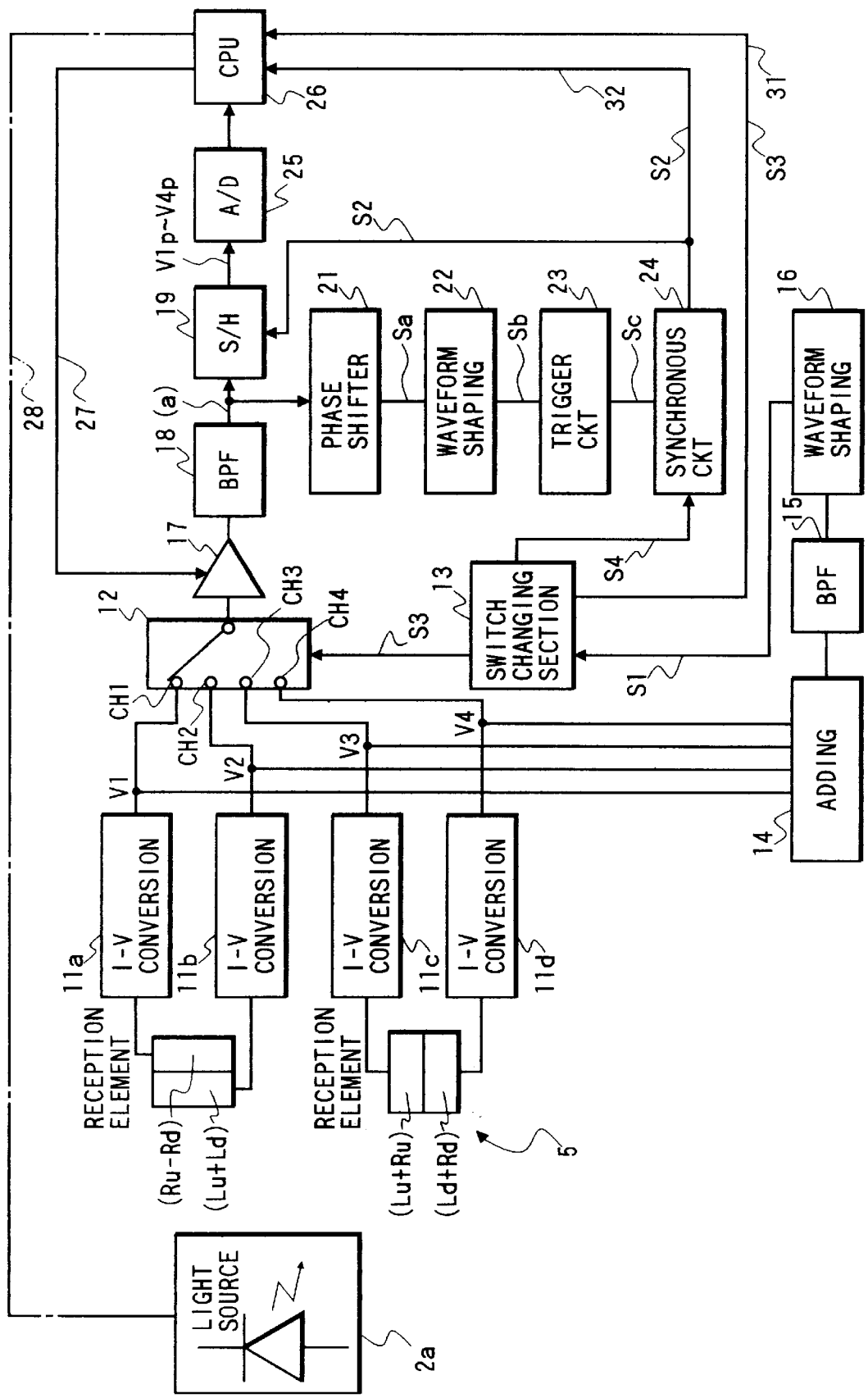
FIG. 1 is a circuit block diagram showing a relative angle detecting device in the first embodiment of the invention.

Embodiments of the present invention will be described referring to the accompanying drawings as follows.

A relative angle detecting device of the embodiments is installed to a remote input device as shown in FIGS. 9 to 11 where input information such as coordinate data is given from an input device 3 to a device body having a screen 1.

In the remote input device shown in FIGS. 9 to 11, a reference light modulated in constant frequency (the intensity varying regularly in constant frequency) is emitted from a light source 2a at the side of the device body having the screen 1 and detected by the 4-divided light receiving sections 5a, 5b, 5c, 5d of a reception element 5 installed to the input device 3. Within the input device 3, a detection current based on received light amount in each light receiving section is converted into voltage, and based on the detection voltage, operation of {(Ru+Rd)−(Lu+Ld)}/Ru+Lu+Ru+Ld) and operation of {(Ru+Lu)−(Ru+Ld)}/(Ru+Lu+Ru+Ld) are carried out. Thereby angle (αx, θy) with respect to the screen 1 of the Z-axis extending vertically from the front surface of the input device 3 (including variation information of the inclination θx and θy) is detected, further the X-Y coordinates on the screen 1 at the position of the Z-axis intersecting the screen (including information regarding the moving distance on the X-Y coordinates) are calculated.

The X-Y coordinates information or angle information (θx, θy) operated in the input device 3 is transmitted as information data regarding the direction with respect to the device body (screen 1) of the input device 3 to the device body by wire telegraphy or radio telegraphy.

Data such as coordinates or angle transmitted from the input device 3 are sent to a main CPU of the device body and processed there, and based on the data, for example, a cursor 8 displayed on the screen 1 is moved. That is, if the direction of the Z-axis (angle θx and θy) of the input device 3 is varied with respect to the screen 1, in response to variation, the information data are given from the input device 3 to the device 3 to the device body and the demodulated in the device body thereby the cursor mark 8 on the screen 1 is moved. Thereby drawing on the screen 1 becomes possible or the cursor mark 8 can be fitted to any position displayed on the screen 1.

Also the input device 3 is provided with a click switch or other operation switch (operation member), and also operation information (operation data) of each switch is transmitted to the device body. Therefore the cursor mark 8 for example is fitted to any position on the screen 1 and the switch of the input device 3 is operated then, thereby the ON or OFF input to the switch mark displayed on the screen 1 becomes possible. Also the operation member includes a power source switch or the like.

FIG. 1 is a block diagram showing the first embodiment of a relative angle detecting device.

In FIG. 1, a light source 2a for emitting a reference light is shown, and as shown in FIG. 9, the light source 2a is installed to the side of the device body such as a computer or a game device. Also circuits other than the light source 2a in FIG. 1 are all mounted on the input device 3.

A reception element 5 has 4-divided light receiving sections 5a, 5b, 5c, 5d similar to those shown in FIG. 11. Received light output (photoelectric conversion output) from each light receiving section is supplied to the current/voltage converters 11a, 11b, 11c, 11d. Among individual received light outputs Lu, Ru, Ld, Rd of the 4-divided light receiving sections 5a, 5b, 5c, 5d of the reception element 5, two outputs are combined and added and the received light outputs due to the adding are supplied to respective current/voltage converters 11a–11d. In FIG. 1, the individual light receiving sections 5a–5d for adding the received light outputs from the individual light receiving sections in combination such as (Ru+Rd) are not shown.

The added output (Ru+Rd) is supplied to the current/voltage converter 11a and converted into received light output voltage V1, and the output (Lu+Ld) is supplied to the current/voltage converter 11b and converted into the received light output voltage V2. Also the output (Lu+Ru) is supplied to the current/voltage converter 11c and converted into the received light output voltage V3, and the output (Lu+Rd) is supplied to the current/voltage converter 11d and converted into the received light output voltage V4.

A time division switch 12 is installed at next stage of each of the current/voltage converters 11a–11d. Received light output voltages V1–V4 passing through the current/voltage converters 11a–11d are changed and outputted in order in definite period by the time division switch 12. The changing timing of the time division switch 12 is set by a switch changing section 13. In the embodiment of FIG. 1, in order to generate a reference signal S1 of switch changing timing by the switch changing section 13, an adder 14, a band pass filter 15 and a waveform shaping section 16 are installed.

Each received light output voltage V1–V4 subjected to time division by the time division switch 12 is amplified by a variable gain amplifier 17 and passes through a band pass filter 18 and is supplied to peak detecting means 19. In the embodiment of FIG. 1, the peak detecting means 19 is a sample/hold circuit. As means for generating a sampling pulse S2 supplied to the sample/hold circuit, a phase shifter 21, a waveform shaping section 22, a trigger circuit 23 and a synchronous circuit 24 are installed on position (a) at the rear stage of the band pass filter 18 and at the front stage of the peak detecting means 19.

Peak voltage V1p–V4p of each of the received light output voltages V1–V4 detected by the peak detecting means 19 is converted into digital value by an analog/digital converter 25 and then is supplied to a CPU 26. The CPU 26 controls the relative angle detecting device as a whole shown in FIG. 1, and acts as arithmetic means operating based on the peak value (peak voltage) converted into the digital value. Also the CPU 26 as arithmetic means is provided internally with a buffer memory for storing the peak voltage temporarily, or the buffer memory is externally installed to the CPU 26.

Next, operation of the relative angle detecting device shown in FIG. 1 will be described.

A reference light of infrared radiation is emitted from the light source 2a installed to the device body. The reference light has intensity varying alternately in constant frequency f1. That is, in the device body, an oscillation section for oscillating constant frequency is installed, and the light source is modulated by this frequency and driven, and infrared light of constant frequency f1 is emitted from the light source 2a.

As shown in FIG. 11, in each of the light receiving sections 5a to 5d of the reception element 5 installed at the input device 3, a reference light narrowed down by a diaphragm 6 is received and the received light outputs (photoelectric conversion outputs) Lu, Ru, Ld, Rd corresponding to the light receiving area are obtained.

Every two of the above-mentioned received light outputs are combined and added by the adder, and received light outputs by adding of (Ru+Rd), (Lu+Ru), (Lu+Ru), (Ld +Rd) respectively are converted into voltage by the current/voltage converters 11a–11d thereby the received light output voltages V1, V2, V3, V4 corresponding to the added values are obtained.

Figure 6A:
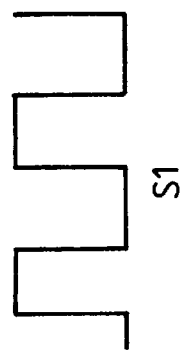
FIG. 6(A) is a waveform chart showing plural received light detection voltages.
Figure 6B:
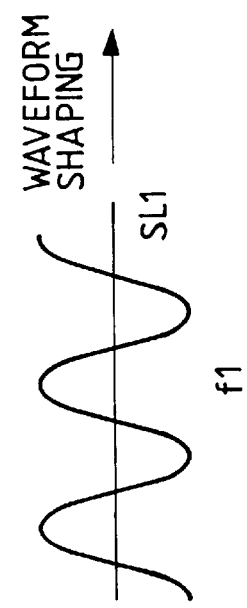
FIG. 6(B) is a diagram showing sinusoidal wave by adding plural received light detection voltages.
Figure 6C:
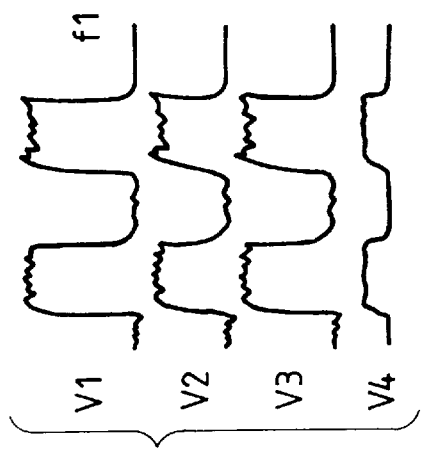
FIG. 6(C) is a waveform chart showing reference signal S1 by waveform shaping of sinusoidal wave.

Each of the received light output voltages V1–V4 is voltage having waveform shown in FIG. 6(A). Respective received light output voltages V1–V4 are fitted to each other in the phase, and different in the level depending on the light receiving area of the light receiving sections 5a–5d. In the adder 14, the received light output voltages V1–V4 are added, and in the band pass filter 15, unnecessary frequency other than the frequency f1 is removed, and sinusoidal waveform of the frequency f1 shown in FIG. 6(B) is obtained. The sinusoidal wave is subjected to waveform shaping by the waveform shaping section 16 constituted by a cross comparator or the like, and a reference signal (reference clock) S1 of rectangular wave shown in FIG. 6(C) is obtained.

The reference signal S1 is supplied to the switch changing section 13. The switch changing section 13 is mainly constituted by a counter, which counts the pulse number of rectangular wave of the reference signal S1. When the count value becomes a definite value, a changing signal S3 is supplied to the time division switch 12, and every time the time division switch 12 receives the changing signal S3, channels are changed in the order of CH1, CH2, CH3, CH4, CH1, CH2, . . . When the time division switch 12 is changed to CH1, the received light output voltage V1 is outputted. Also when the time division switch 12 is changed to CH2, CH3, CH4, the received light output voltages V2, V3, V4 are outputted respectively.

The received light output voltages outputted in order in definite period by the time division are amplified by the variable gain amplifier 17 and subjected to filtering by the band pass filter 18 where unnecessary frequency component other than the frequency f1 is removed.

Figure 8:
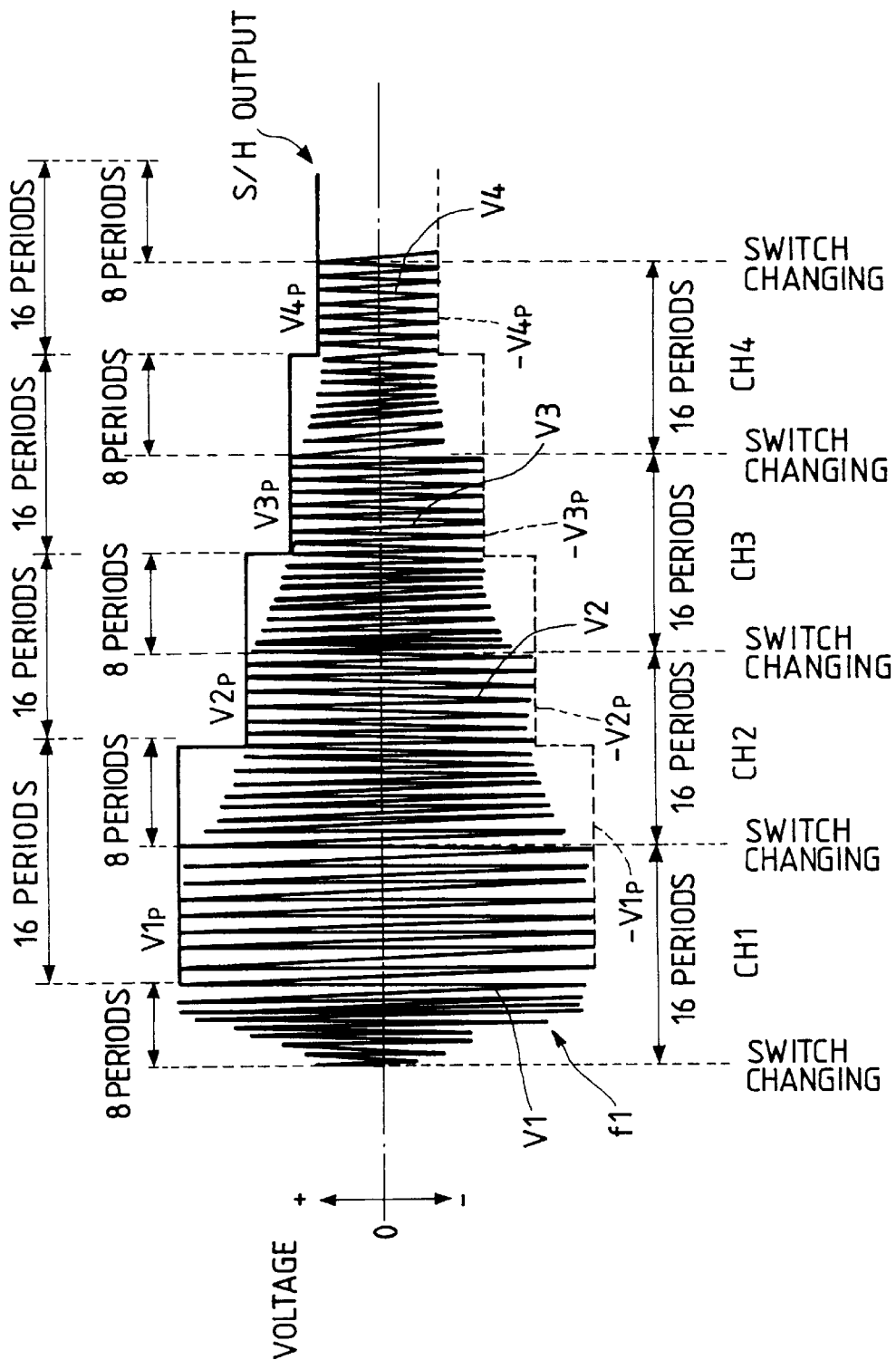
FIG. 8 is a waveform chart showing each received light detection voltage through a band pass filter and peak value being held.

FIG. 8 shows the received light output voltages V1–V4 immediately after the filtering by the band pass filter 18. As shown in FIG. 8, in the switch changing section 13, every time pulse of rectangular wave of the reference signal S1 is counted 16 pulse, the changing signal S3 is supplied to the time division switch 12. Therefore the received light output voltage of the frequency f1 is changed every 16 periods by the time division switch 12. That is, the time division switch 12 as shown in FIG. 8 is changed to channels CH1, CH2, CH3, CH4, thereby the received light output voltages V1, V2, V3, V4 are outputted corresponding to 16 periods.

Next, peak value (peak voltage) V1p–V4p of each of the received light output voltages V1–V4 shown in FIG. 8 is detected by the peak detecting means 19 as a sample/hold circuit.

FIG. 7(A) shows received light output voltage (any of V1–V4) of some time point at position (a) between the band pass filter 18 and the peak detecting means 19. The received light output voltage to the position (a) is supplied intact to the peak detecting means 19 and also to the phase shifter 21. The phase shifter 21 advances the received light output voltage by period corresponding to 45 degrees. FIG. 7(B) shows sinusoidal waveform 5a advanced by period of 45 degrees.

The waveform shaping section 22 is mainly constituted by a comparator, and the threshold level by the comparator is shown by SL2. FIG. 7(C) shows rectangular wave Sb subjected to waveform shaping by the waveform shaping section 22. The trigger circuit 23 is one–shot trigger circuit, and duty factor of high level and low level of the rectangular wave Sb is varied by the trigger circuit 23 and one–shot pulse Sc is generated. The one-shot pulse Sc becomes a pulse rising at (ii) in synchronization with the rise of the rectangular wave 5b and falling at (iii) after the time T1. In the trigger circuit 23, the time T1 is determined to ⅛ (45 degrees) of one period of the waveform of the frequency f1. Consequently, the fall of the one-shot pulse Sc is coincident with the peak position P of the sinusoidal wave of the received light output voltage shown in FIG. 7(A). In addition, at the time point of passing through the trigger circuit 23, as shown in FIG. 7(D), the one-shot pulse Sc of one piece is generated every one period of the received light output voltage.

Next, FIG. 7(E) shows a reference signal (reference clock) S1 subjected to waveform shaping by the waveform shaping section 16 and supplied to the switch changing section 13. The reference signal S1 is generated based on the waveform by adding received light output voltages V1–V4, and its period is substantially coincident with that of the received light output voltage (FIG. 7(A)) at the position (a). Also the threshold level of the comparator in the waveform section 16 is shown by SL1 in FIG. 7(A) for convenience.

The switch changing section 13 is mainly constituted by a counter, and if the count value becomes value corresponding to 16 periods, the time division switch 12 is changed by the changing signal S3, and the timing of changing the time division switch 12 is synchronous with the rise of the rectangular pulse of the reference signal S1. In the counter of the switch changing section 13, the rectangular pulse of the reference signal S1 is counted from the time immediately after supplying the changing signal S3 to the time division switch 12, and in synchronization with the rise of next reference signal S1 that the count value becomes eight, an allowance signal S4 of peak detection is supplied to the synchronous circuit 24. As shown in FIG. 7(F), the allowance signal S4 is rectangular pulse with length of the time T2, and the time T2 is coincident with one period of the reference signal S1.

That is, in the switch changing section 13, after changing the time division switch 12, time corresponding to eight periods of the reference signal S1 passes, and the allowance signal S4 is generated so that high level continues by one period (time T2) from the moment of the ninth pulse rising to the moment of the tenth pulse rising in the rectangular pulse of the reference signal S1, and the allowance signal S4 is supplied to the synchronous circuit 24. Or by the counter of the switch changing section 13, the allowance signal by one shot is supplied to the synchronous circuit 24 respectively at the time of the ninth pulse rising and at the time of the tenth pulse rising, and the signal S4 of rectangular wave as shown in FIG. 7(F) may be generated within the synchronous circuit 24.

The synchronous circuit 24 is mainly constituted by AND gate, and logical sum of the one-shot pulse Sc passing through the trigger circuit 23 and the allowance signal S4 is operated by the AND gate, and as a result of the logical sum, a sampling pulse S2 shown in FIG. 7(G) is formed. The one-shot pulse Sc shown in FIG. 7(D) rises every one period of the waveform of FIG. 7(B), and by passing through the synchronous circuit 24, one-shot pulse Sc other than that rising between the ninth pulse and the tenth pulse of the reference signal S1 is removed.

In the sample/hold circuit of the peak detecting means 19, as shown in FIG. 7(H), the received light output voltage inputted from the position (a) is sampled in synchronization with rise of the sampling pulse S2, and voltage at the falling time of the sampling pulse S2 is held. Since the pulse length T1 of one-shot pulse in FIG. 7(D) is set to ⅛ of one period, the peak value P of the received light output voltage can be detected and the value is held.

According to the above–mentioned circuit configuration, as shown in FIG. 8, after the time division switch 12 is changed to each channel, the peak voltage immediately after lapse of the eight periods of the received light output voltage is detected and held. As shown in FIG. 8, immediately after changing the time division switch 12, initial voltage output in each channel varies due to transient phenomenon of the switch changing. Consequently, as above described, after lapse of eight periods after changing the time division switch 12, the received light output voltage is sampled and the peak value (peak voltage) is held, thereby the peak voltage V1$p$, V2$p$, V3$p$, V4$p$ of each of the received light output voltages V1–V4 can be detected correctly.

Also as shown in FIG. 8, channel changing by the time division switch 12 is carried out every 16 periods of the received light output voltage, and the peak holding is carried out immediately after lapse of eight periods after the channel changing. Therefore the output time of the peak voltage V1$p$, V2$p$, V3$p$, V4$p$ varying stepwise corresponds to 16 periods being the same as that of the channel changing of the time division switch 12. In addition, the peak holding may be carried out after lapse of the prescribed period after changing the time division switch 12, and need not be necessarily carried out after lapse of eight periods. However, considering variation of the output of transient phenomenon after the channel changing, it is preferable that the sampling is carried out after lapse of six periods, seven periods or eight periods in the stable state.

In the sample/hold operation as above described, the reference signal S1 being self clock signal is generated based on the received light detection output received by the reception element 5, and the time division switch 12 is changed in synchronization with the reference signal S1, and at the same time the peak voltage is held based on the allowance signal S4 in synchronization with the reference signal S1. Therefore the timing of holding the peak voltage is set with high precision. Also since one-shot pulse Sc as the base of the sampling pulse is generated based on the waveform with the phase shifted by the phase shifter, the detection precision of the peak value of the received output voltage becomes high.

Next, the peak voltages V1$p$, V2$p$, V3$p$, V4$p$ detected and held as shown in FIG. 8 are converted into digital values by the analog/digital converter 25 and supplied to the CPU 26.

In the CPU 26, digital values of the peak voltages V1$p$, V2$p$, V3$p$, V4$p$ are inputted in order at regular period intervals (every 16 periods of the frequency f1), and individual peak voltages are stored in sequence to the internal memory or the external memory. After the digital values of the peak voltages V1$p$, V2$p$, V3$p$, V4$p$ are stored in one set or several sets to the memory, the values are read out and the digital value of each voltage is operated.

This operation is $\{(V1p-V2p)/(V1p+V2p)\}$ and $\{(V3p-V4p)/(V3p+V4p)\}$. By operation of the former, the inclination component in θx direction of the input device 3 in FIG. 9 is obtained, and by operation of the latter, the inclination component in θy direction of the input device 3 is obtained. Based on the inclination components of θx and θy, coordinate information in terms of distance on the X-Y coordinates of the screen 1 is operated, and such information and further operation information of the operation member installed to the input device 3 are supplied to the device body by wire telegraphy or radio telegraphy.

Also the digital values of the peak voltages V1$p$, V2$p$, V3$p$, V4$p$ stored in the memory by the CPU 26 are added, and the gain control signal 27 is supplied to the variable gain amplifier 17 by the added components. Thereby gain of the amplifier 17 for amplifying each received light output voltage passing through the time division switch 12 is controlled. Although the peak voltages V1$p$, V2$p$, V3$p$, V4$p$ are detected in separate time bands respectively, these digital values are stored in the memory and all peak voltages are added and the gain control signal 27 is generated, thereby gain of the amplifier 17 is controlled correctly. That is, amplification in the same factor can be carried out to the individual received light output voltages V1, V2, V3, V4 subjected to the time division.

Also in response to the added values of the digital values of the peak voltages V1$p$, V2$p$, V3$p$, V4$p$ in memory, the gain control is carried out, and control information is supplied to the side of the device body by the signal transmission channel (radio telegraphy or wire telegraphy) 28 thereby the emission intensity of the light source 2$a$ emitting the reference light may be controlled.

Also the changing signal S3 is supplied from the switch changing section 13 through the line 31 to the CPU 26, and the sampling pulse S2 is supplied from the synchronous circuit 24 through the line 32 to the CPU 26. Thereby in the CPU 26, it can be recognized that the time division is carried out normally or the sample/hold is carried out.

Figure 2:
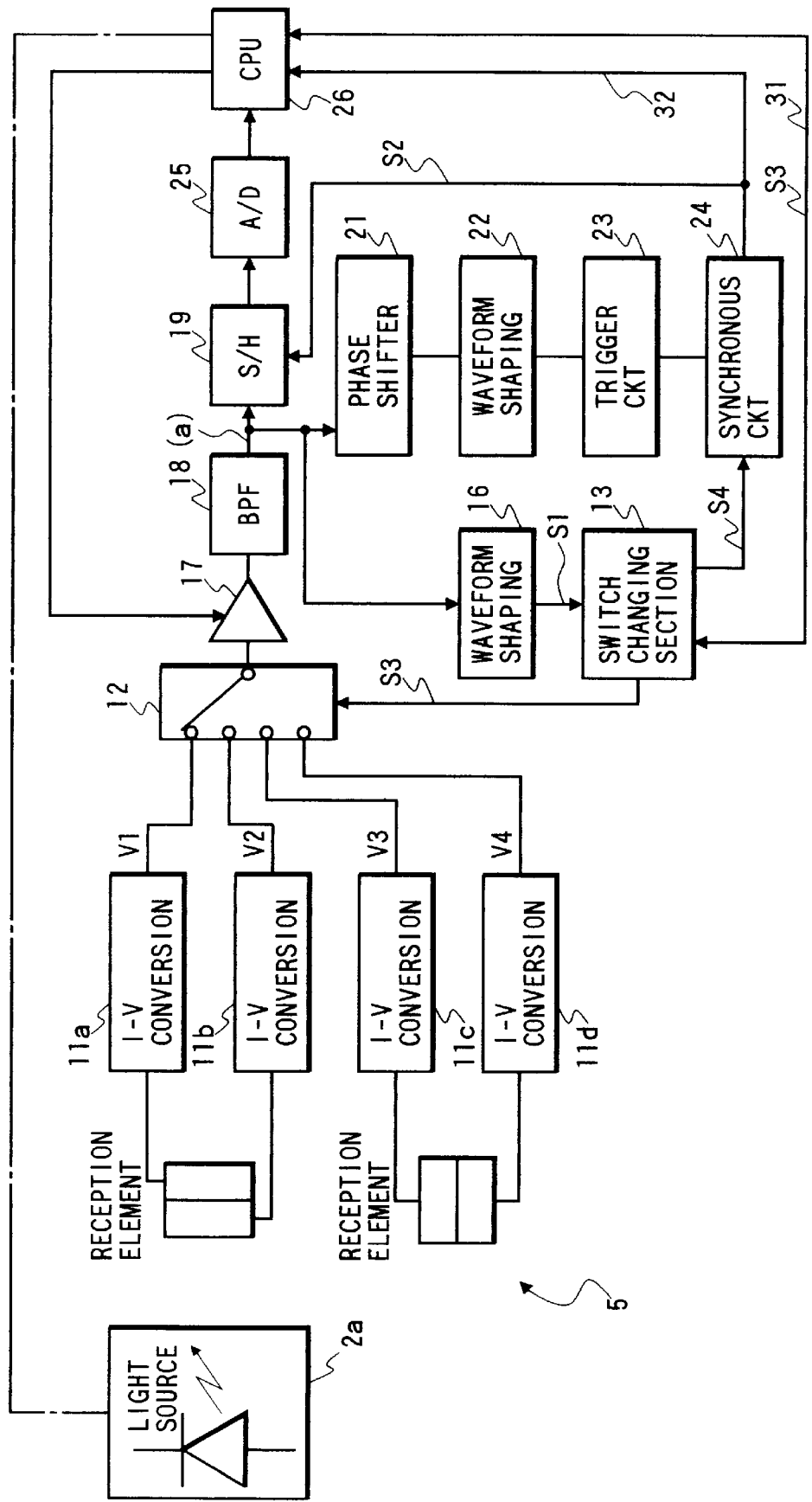
FIG. 2 is a circuit block diagram showing a relative angle detecting device in the second embodiment of the invention.

FIG. 2 shows a relative angle detecting device in the second embodiment of the present invention.

Difference of this embodiment from the preceding embodiment shown in FIG. 1 will be described.

Each of received light output voltages V1–V4 changed by a time division switch 12 passes through a variable gain amplifier 17 and is subjected to filtering by a band pass filter 18, and from position (a) after the filtering, voltage is taken out and sent to a waveform shaping section 16. The waveform shaping section 16 is the same as the waveform shaping section designated by the same reference numeral in FIG. 1, and serves to generate a reference signal S1. In the embodiment of FIG. 2, however, received light output voltage taken from the position (a) is subjected to waveform shaping in the waveform shaping section 16, and a reference signal S1 is generated and supplied to a switch changing section 13.

Other circuits are the same as those in FIG. 1, and in the switch changing section 13, the reference signal S1 is counted and a changing signal S3 and an allowance signal S4 of peak detection are generated.

In the embodiment of FIG. 2, the adder 14 and the band pass filter 15 shown in FIG. 1 are omitted, and a band pass filter 18 serves also as the band pass filter 15 to generate the reference signal S1. Consequently in FIG. 2, circuit configuration can be simplified.

Also in the embodiment shown in FIG. 2, since voltage taken from position immediately before peak detecting means 19 generates the reference signal S1, an allowance signal S4 in FIG. 7(F) generated based on the reference signal S1 and one-shot pulse Sc generated based on the voltage obtained from the position (a) are not largely shifted in the phase. For example, such problem is not liable to occur that one-shot pulse Sc deviates from the time T2 of the allowance signal S4 and a sampling pulse Sc being AND output is not outputted.

Also in the embodiment of FIG. 1, since received light output voltages V1–V4 before the time division are added in the adder 14 and a reference signal S1 is generated by the waveform shaping section 16, when error is produced in the time division in the time division switch 12, for example, even if output is not obtained in any of channels, generation of the reference signal S1 is not affected. Consequently the generation of the reference signal S1 is continued and the time division switch 12 is continued to operate based on the reference signal S1. On the other hand, in the embodiment shown in FIG. 2, if received light output voltage is not obtained from any of channels due to the time division error by the time division switch 12, no reference signal S1 is generated and changing of the time division switch 12 is stopped.

In order to continue the changing of the time division switch 12 always, the embodiment of FIG. 1 is preferable. However, if the time division error is produced in the embodiment of FIG. 2, since the reference signal S1 is not generated and the changing signal S3 is not sent to the time division switch 12 and the allowance signal S4 is not supplied to the synchronous circuit, no sampling pulse 32 is generated. Since such information is supplied from the lines 31 and 32 immediately to the CPU 26, in the CPU 26, it can be immediately recognized that the received light detection error is produced, and processing such as stopping the whole operation can be taken. From this point of view, also the embodiment shown in FIG. 2 becomes preferable.

Figure 3:
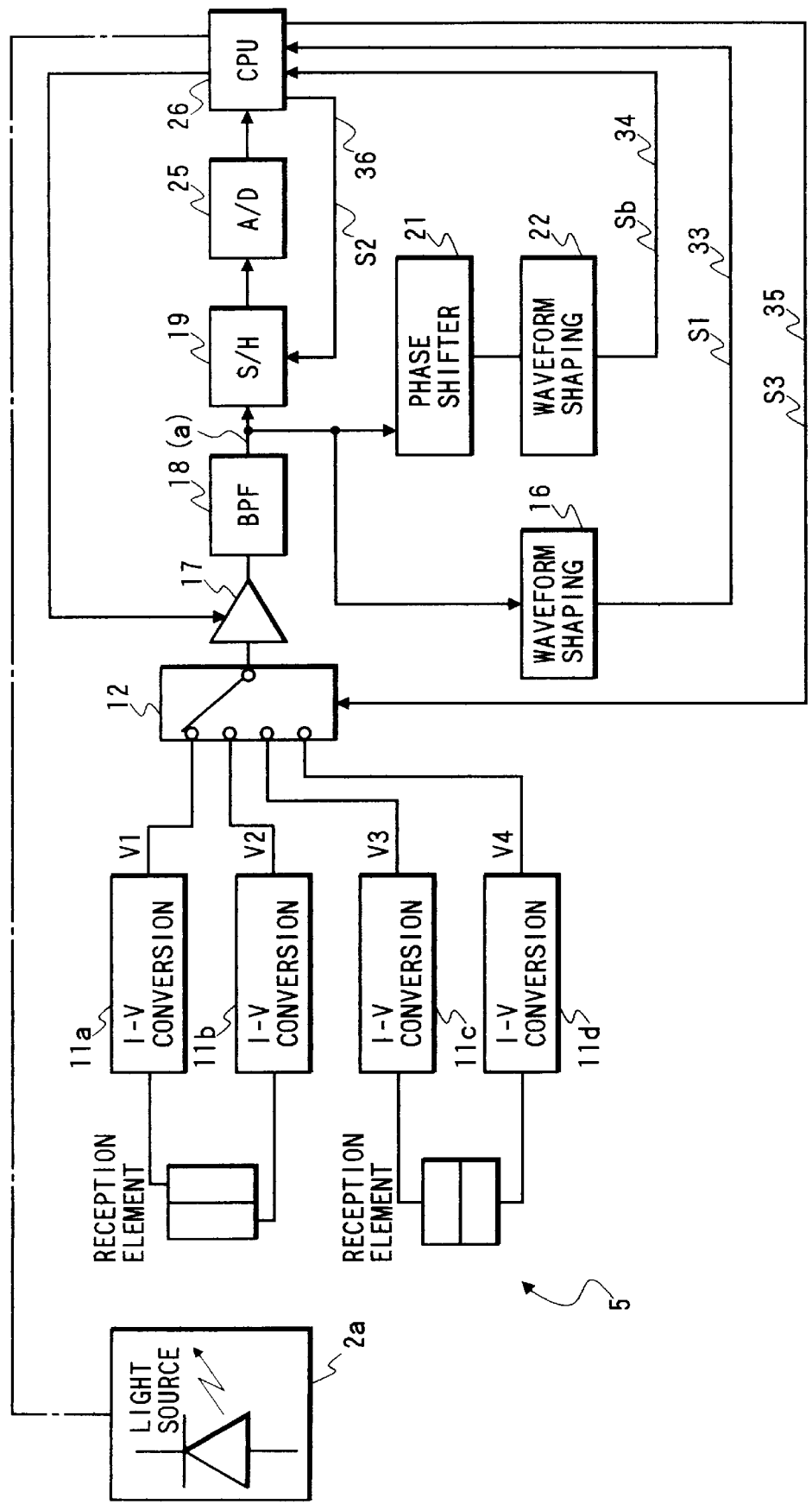
FIG. 3 is a circuit block diagram showing a relative angle detecting device in the third embodiment of the invention.

FIG. 3 shows a relative angle detecting device in the third embodiment of the present invention.

In this embodiment, received light output voltage is taken from position (a) passing through a band pass filter 18 and subjected to waveform shaping by a waveform shaping section 16 thereby a reference signal S1 is generated. The reference signal S1 is given by a line 33 to a CPU 26. Also phase of the received light detection voltage taken from the position (a) is shifted by 45 degrees in a phase shifter 21, and the voltage with phase shifted is subjected to waveform shaping by a waveform shaping section 22, and rectangular wave Sb shown in FIG. 7(C) is given by a line 34 to the CPU 26.

The CPU 26 functions not only as arithmetic means of the peak voltage of the received light detection voltage but also as a synchronous circuit 24 with a switch changing section 13 and a trigger circuit 23 shown in FIG. 1 and FIG. 2. The function as the synchronous circuit 24 with the switch changing section 13 and the trigger circuit 23 is exhibited by execution of software.

By execution of software in the CPU 26, first, the reference signal S1 is counted, and, for example, a changing signal S3 is supplied to the time division switch 12 every 16 periods by a line 35 and changing of each channel of the time division switch 12 is carried out.

The same waveform processing as that shown in FIG. 7 is carried out by software, and a sampling pulse S2 shown in FIG. 7(G) is generated and given from a line 36 to peak detecting means 19, and sampling of the received light output voltage and holding of the peak voltage are carried out as shown in FIG. 7(H).

Figure 4:
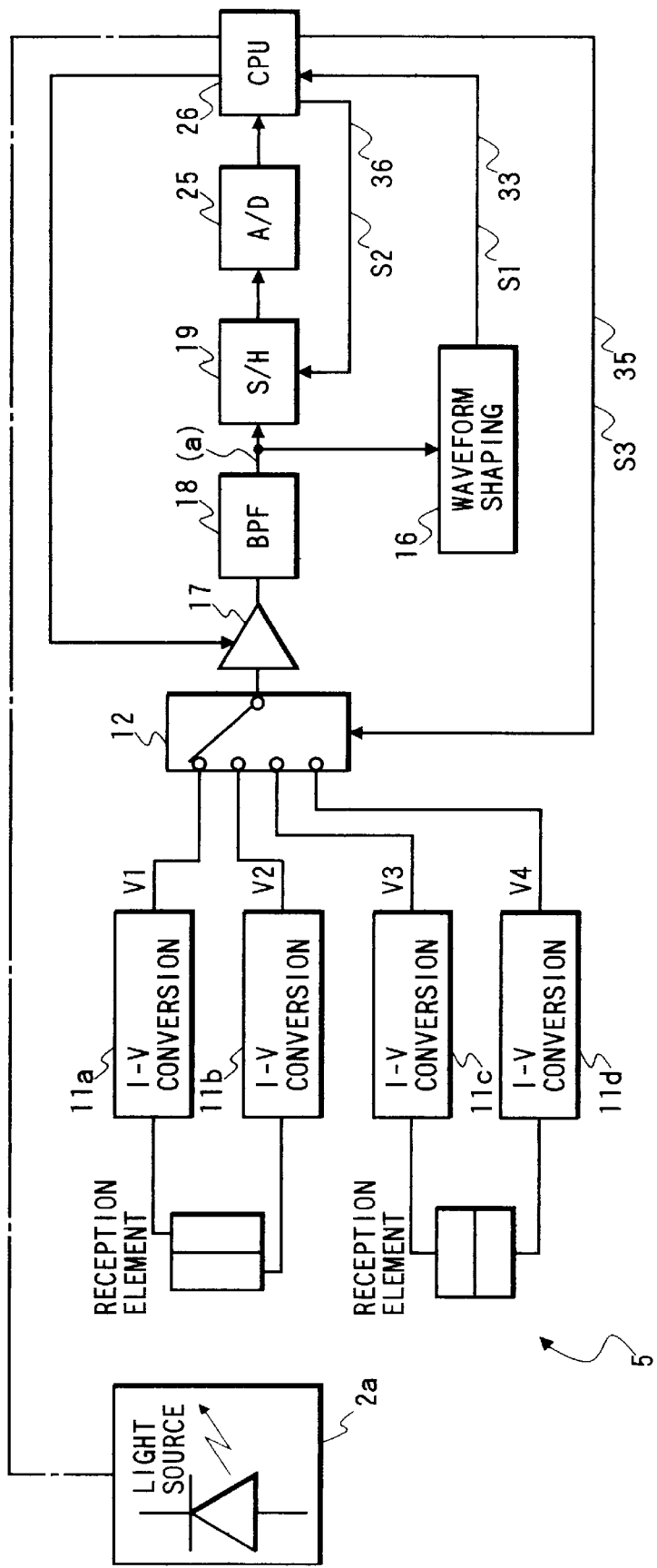
FIG. 4 is a circuit block diagram showing a relative angle detecting device in the fourth embodiment of the invention.

FIG. 4 shows a relative angle detecting device in the fourth embodiment of the present invention.

In this embodiment, function by software executed by a CPU 26 is further increased, and function as a switch changing section 13, a phase shifter 21, a trigger circuit 23, a synchronous circuit 24 is exhibited by the software.

Received light output voltage taken from position (a) is subjected to waveform shaping by a waveform shaping section 16, thereby a reference signal S1 is generated and supplied through a line 33 to the CPU 26. A changing signal S3 is supplied from the CPU 26 directly to a time division switch 12 through a line 35 and the time division switch 12 is changed.

Also in the CPU 26, phase of the reference signal S1 is shifted by 45 degrees and rectangular waveform of FIG. 7(C) is generated, and a sampling pulse S2 is generated from the rectangular wave of FIG. 7(C) and the reference signal S1 as the base and supplied by a line 36 to peak detecting means 19 thereby sampling of the received light output voltage and holding of the peak voltage are carried out.

Also in circuit configuration shown in FIG. 4, the reference signal S1 obtained from the waveform shaping section 16 is inputted to the CPU 26, and in the CPU 26, timing of rise and fall of the reference signal S1 can be counted in a clock contained in the CPU and timing signal can be given to the peak detecting means 19 every prescribed time. In the peak detecting means 19, the peak value is detected based on the timing signal. In this case, peak values $V1p$, $V2p$, $V3p$, $V4p$ of the received light output voltages can be detected in the peak detecting means 19, and peak values $-V1p$, $-V2p$, $-V3p$, $-V4p$ at the minus side of bottom values of the received light output voltages can be detected as shown in broken line in FIG. 8. Difference values $(V1p)-(-V1p)$, $(V2p)-(-V2p)$, ... between the peak values at the plus side $V1p$, $V2p$, ... and the peak values at the minus side $-V1p$, $-V2p$, ... are operated thereby the peak values of the received light output voltages can be detected with high precision, even when fluctuation or vibration of the received light output voltage exists due to influence of outer disturbing light or noise with respect to the reference voltage (0V) shown in FIG. 8.

Also in the embodiments of FIG. 3 and FIG. 4, by software executed in the CPU 26, other waveform processing is possible.

For example, the peak detecting means 19 may be not a sample/hold circuit but a peak/hold circuit. In the CPU 26, first, the changing signal S3 is supplied to the time division switch 12 based on the reference signal S1 given from the waveform shaping section 16, and then the reference signal S1 is counted thereby after lapse of eight periods after the time division changing, the timing (i) of rise of the ninth reference signal S1 can be recognized (refer to FIG. 7(E)). Also by shifting phase of the reference signal S1 by 45 degrees within the CPU 26, the timing (ii) of rise of the one-shot pulse Sc immediately after (i) can be determined, and further by counting the clock contained in the CPU, the time T1 can be measured and the timing (iii) of fall of the one-shot pulse Sc can be known. Holding signal is supplied from the line 36 to the peak detecting means 19 being peak/hold circuit fitting to the timing (iii). Thereby the peak value of the received light output voltage can be held by the peak detecting means 19.

Figure 5:
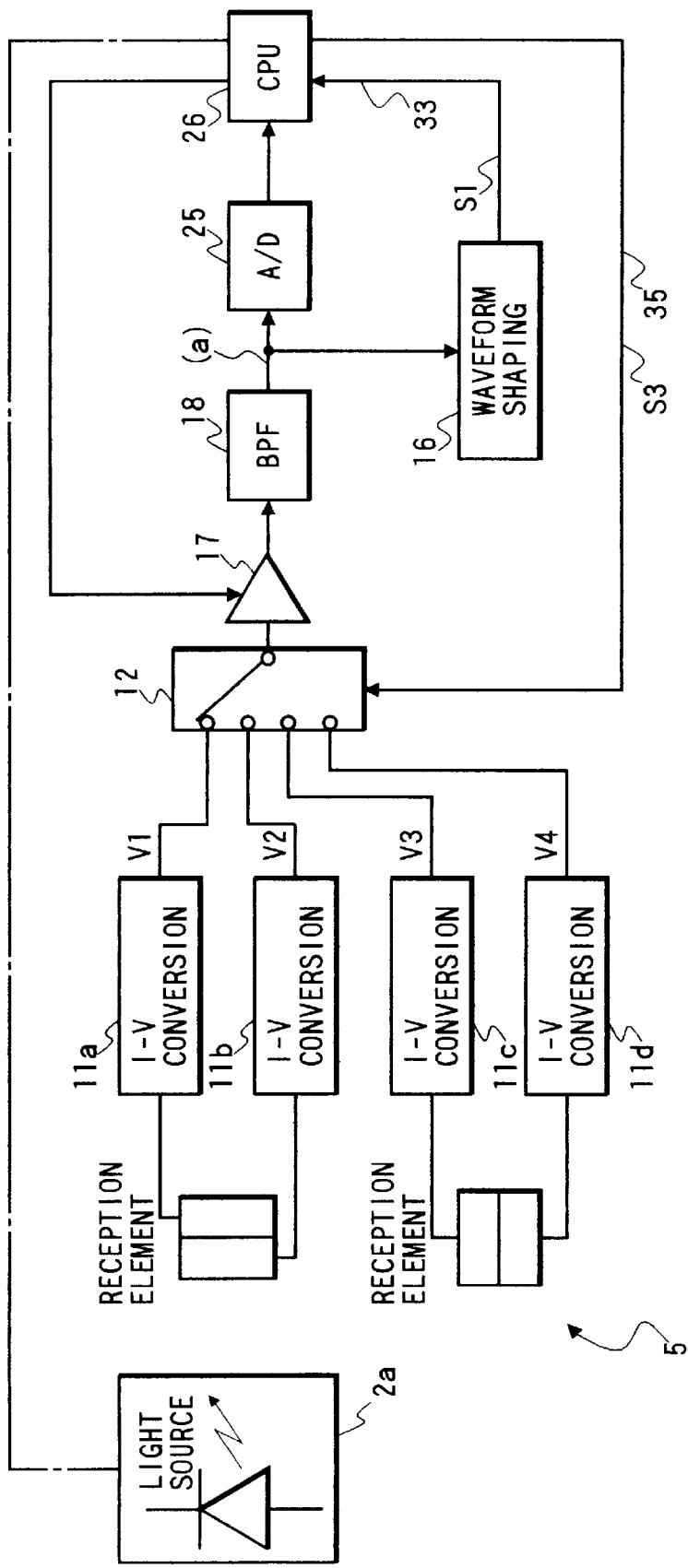
FIG. 5 is a circuit block diagram showing a relative angle detecting device in the fifth embodiment of the invention.

Further in a relative angle detecting device of the fifth embodiment as shown in FIG. 5, received light output voltage passing through a band pass filter 18 is converted into digital value by an analog/digital converter 25 and then is supplied to a CPU 26, and in the CPU 26, based on reference signal S1 from a waveform shaping section 16, setting of the detection timing of the peak value of the received light output voltage and the detection of the peak value may be carried out by software.

Next, the sixth embodiment of the present invention will be described in detail using FIG. 12.

As shown in FIG. 12, a computer (controlled type image display device) 51 is provided with a CRT (cathode ray tube, i.e., display unit) 53 for displaying an image, a light emitting section 52 disposed on peripheral portion of the CRT 53, for example, on the upper side thereof, and a light signal reception section 54. A portable input device 55 has whole configuration in long rectangular parallelepiped, and a detecting section (not shown) is installed at the front surface of the input device 55. The detection section is constituted by a reception element 56 provided with 4-divided light receiving sections 56a to 56d made of photo diode for example, and a diaphragm (not shown) having a rectangular aperture and a visible light cut filter (not shown) respectively disposed at the front surface side of the reception element 56. In the 4-divided light receiving sections 56a to 56d, the light receiving sections 56b and 56d are connected to a current/voltage converter 57a so that output currents thereof are added, and the light receiving sections 56a and 56c are connected to a current/voltage converter 57b so that output currents thereof are added. Also the light receiving sections 56a and 56b are connected to a current/voltage converter 57c so that output currents thereof are added, and the light receiving sections 56c and 56d are connected to a current/voltage converter 57d so that output currents thereof are added. Output of each of the current/voltage converters 57a to 57d is connected separately to the stationary contact terminal side of a changing switch (changing circuit) 58 of one circuit and four contacts, and a movable contact terminal of the changing switch 58 is connected to each input of a signal processing unit 60 and a voltage level detection section 64. The changing switch 58 is connected to a switch changing control unit 59, and contacts are changed by control of the switch changing control unit 59. Although not shown, the signal processing unit 60 is provided internally with a variable gain amplifier, a band pass filter, a peak holding circuit, e.g., a sample/hold circuit and an analog/digital converter, and output of the signal processing unit 60 is connected to a control unit 62. Output of the band pass filter within the signal processing unit 60 is connected to input of a waveform shaping circuit 61, and output of the waveform shaping circuit 61 and output of a level detection section 64 are connected to the control unit 62 respectively. The control unit 62 is connected to the switch control unit 59 and a light signal transmission section 63 respectively.

In this case, regarding the three directions represented by the three–dimensional orthogonal coordinates, if the length direction of the portable input device 55 is made the Z-axis direction and the two directions orthogonal to the Z-axis are made the X-axis direction and the Y-axis direction respectively, the 4-divided light receiving sections 56a to 56d constituting the reception element 56 are arranged so that the light receiving sections 56a and 56b and the light receiving sections 56b and 5d are arranged in the X-axis direction, and also the light receiving sections 56a and 56c and the light receiving sections 56b and 56d are arranged in the Y-axis direction.

The relative angle detecting device of the embodiment having the above-mentioned configuration operates as follows.

Now, if an operator holds the portable input device 55 by hands and the detecting section side is directed to the direction of the CRT 53 (direction of the light emitting section 52), a reference light of infrared region of the frequency f emitted from the light source of the light emitting section 52 is incident to the detecting section of the portable input device 55. In the incident reference light, first, visible light component is moved in a visible light cut filter (not shown), and next, the light incident amount is adjusted in a diaphragm (not shown) and then the reference light is irradiated to the 4divided light receiving sections 56a to 56d constituting the reception element 56. Then rectangular spot light determined by an aperture of the diaphragm is irradiated to the 4-divided light receiving sections 56a to 56d , and current outputs $I_{LU}$, $I_{LD}$, $I_{RD}$ corresponding to the irradiation area of the spot light are outputted from the 4-divided light receiving sections 56a to 56d . Any of these current outputs $I_{LU}$, $I_{RU}$, $I_{LD}$, $I_{RD}$ includes the frequency f being the main component of the reference light. Among these currents $I_{LU}$, $I_{RU}$, $I_{LD}$, $I_{RD}$, sum of current outputs $(I_{RU}+I_{RD})$ obtained in one set of the light receiving sections 56a and 56c arranged in the Y-axis direction is supplied to the current/voltage converter 57a, and sum of current outputs $(I_{LU}+I_{LD})$ obtained in other set of the light receiving sections 56b and 56d arranged in the Y-axis direction is supplied to the current/voltage converter 57b respectively. Also sum of current outputs $(I_{LU}+I_{RU})$ obtained in one set of the light receiving sections 56a and 56b arranged in the X-axis direction is supplied to the current/voltage converter 57c, and sum of current outputs $(I_{LD}+I_{RD})$ obtained in other set of the light receiving sections 56c and 56d arranged in the X-axis direction is supplied to the current/voltage converter 57d respectively. Each of the current/voltage converters 57a to 57d converts input current into output voltage, and received light output voltages V1 to V4 are arranged to channels 1 to 4 in respective outputs. Subsequently these received light output voltages V1 to V4 are supplied to the changing switch 58, and in the changing switch 58, by the switch changing control unit 59 operating in response to changing signal supplied from the control unit 62, movable contacts are changed in prescribed period in the order as follows. Therefore the received light output voltages V1 to V4 are selected in time division into time division output voltages by the changing switch 58, and the time division output voltages are supplied to the succeeding signal processing unit 60. The time division output voltages supplied to the signal processing unit 60 are first amplified in the variable gain amplifier with gain in response to the gain control voltage supplied from the control unit 62, subsequently unnecessary frequency component other than the frequency f is removed in the band pass filter. Further the signal of the frequency f obtained in the output of the band pass filter is subjected to sampling and holding in the sample/hold circuit; subsequently the sampling voltage is converted into digital signal in the analog/digital converter and the digital signal is supplied as relative angle data to the control unit 62.

Also in the signal processing unit 60, the signal of the frequency f obtained in the output of the band pass filter is supplied to the waveform shaping circuit 61, and when the signal of the frequency f becomes the stable state after the channel changing of the changing switch 58 is carried out, the waveform shaping circuit 61 in cooperation with the control unit 62, generates trigger pulse or the like to be outputted in coincidence with the coming state of the peak voltage, and in response to the trigger pulse or the like, the control unit 62 supplies timing pulse or the like to command the start and the end of sampling to the sample/hold circuit, and also supplies timing pulse or the like to command the start or the end of digital conversion to the analog/digital converter.

Then the sample/hold circuit starts sampling of the signal of the frequency f obtained in the output of the band pass filter by timing pulse supplied from the control unit 62, and holds the sampling voltage obtained by the sampling. The sampling voltage becomes peak voltage in the stable state indicating the amplitude peak of one signal period, after lapse of plural periods of the signal of the frequency f obtained in the output of the band pass filter after the channel changing by the changing switch 58 is carried out. Subsequently the analog/digital converter converts the sampling voltage held in the sample/hold circuit into digital signal by timing pulse supplied from the control unit 62, and the relative angle data obtained then is supplied to the control unit 62.

The control unit 62 operates the relative angle data supplied in sequence in response to changing of the changing switch 58, and when the relative angle data (digital peak voltage) led from the received light output voltages V1, V2, V3, V4 are V1p, V2p, V3p, V4p respectively, $\{(V1p-V2p)/(V1p+V2p)\}$ and $\{(V3p-V4p)/(V3p+v4p)\}$ are operated. By the operation of the former, inclination angle θx of the portable input device 55 in the X-axis direction is estimated, and by the operation of the latter, the inclination angle θy of the input device 55 in the Y-axis direction is estimated. Based on the estimated θx, θy, the control unit 62 carries out coordinate calculation in terms of distance on the X-Y coordinates of the display surface of the CRT 53, and supplies the calculation result to the light signal transmission section 63. The light signal transmission section 63 transmits the calculation result with a light signal reception section 54 on the side of the computer 51, and based on the calculation result in the received light signal, the light signal reception section 54 carries out display in the form of a cursor mark or the like at desired portion of the display surface of the CRT 53.

In this case, when the operation suitably moves the detection section of the portable input device 55 held by hands substantially in parallel to the display surface of the CRT 53, or suitably varies the angle with respect to the display surface, the inclination angle θx in the X-axis direction and the inclination angle θy in the Y-axis direction of the portable input device 55 are varied at any time, and in response to the variation, the position of the cursor mark indicated on the display surface of the CRT 53 is varied at any time.

Next, the level detector 64 detects the voltage level of each channel in the time division output voltage obtained at the output side of the changing switch 58, and supplies the detected voltage level of each channel to the control unit 62. If the voltage level of each channel is supplied from the level detector 64, the control unit 62 compares the amount of the voltage level, and adjusts the channel changing signal to be supplied to the switch changing control unit 59 next time based on the comparison result, and channel of next time is selected in order from larger amount of the voltage level. For example, at the selection state of channel of next time, regarding the voltage levels V1, V2, V3, V4 of channels 1 to 4 in the time division output voltage obtained at the output side of the changing switch 58, if the order of the amount of those is in V3>V1>V4>V2 the channel changing signal is adjusted so that channel selection of next time is carried out in the order of channel 3, channel 1, channel 4, channel 2. Also if the order of the voltage levels V1, V2, V3, V4 in channels 1 to 4 is not changed thereafter, the channel changing signal is adjusted so that channel selection of still next time is carried out in the order of channel 3, channel 1, channel 4, channel 2. On the other hand, if the order of the amount of the voltage levels V1, V2, V3, V4 in channels 1 to 4 is changed, the channel changing signal is adjusted so that channel selection of next time is carried out in the order according to the changing.

At the operation start of the relative angle detecting device, at first, since the voltage level of each channel is not yet supplied from the level detector 64 to the control unit 62, the channel changing signal to be supplied to the switch changing control unit 59 becomes a channel changing signal so that selection of channels is carried out in the prescribed order, for example, in the order of channel 1, channel 2, channel 3, channel 4.

Thus according to the embodiment, at channel selection state of every time, the voltage level detection section 64 detects the voltage level of each channel of the time division output voltage obtained at channel selection of preceding time, and the control unit 62 compares the amount of the voltage at each channel detected in the voltage level detection section 64 and supplies the channel changing signal of next time to the switch changing control unit 59 so that channels are selected in the order of the amount of the voltage level at next time, thereby such state can be avoided that the voltage level of channel selected at first is too small or substantially zero. In this case, since gain of the signal processing section 60 is controlled with respect to the A/D conversion value in the channel with larger voltage level, the gain of the signal processing unit 60 is fixed within some region by the larger voltage level coming at first, thereby the timing of the A/D conversion becomes stable and decision of the channel voltage and the noise voltage becomes easy, and further the relative angle detection data outputted from the signal processing unit 60 can always made correct.

In the embodiment as above described, although the description has been carried out in an example that the controlled type information processing unit 51 is a computer, the invention is not limited to the case that the information processing unit 51 is a computer, but may be applied also to other device having a display section, for example, a game device or an AV device.

Also in the embodiment, although the description has been made in an example that the 4-divided light receiving sections 56a to 56d are used as the reception element 56, the present invention is not limited to the case that the reception element 56 is the 4-divided light receiving sections 56a to 56d but may be applied also to the case that the reception element is the 6divided light receiving sections or the light receiving sections divided in other number. However, when the reception element 56 is set to the light receiving sections divided in number other than 4, corresponding to the set number, the number of the current/voltage converters 57a to 57d must be, of course, changed.

In the present invention as above described, since a plurality of received light outputs can be processed by processing circuits having the same characteristics, ratio of the plurality of received light outputs can be detected with high precision.

Also in the present invention, when a plurality of received light outputs are subjected to time division, the timing of the dividing can be set with high precision using a simple circuit.

Further in the present invention, when light from a light source with intensity varying in prescribed frequency is received, the peak value of the received light output can be detected in timing with high precision, and also when plural received light outputs are obtained in time division, the peak value can be detected at the stable state of the received light outputs thereby the peak value of the received light outputs can be detected correctly.

Further according to the present invention, the voltage level detection section 64 detects the voltage level of each channel of the time division output voltage obtained at channel selection of the preceding time and supplies the detected voltage level to the control unit 62, and the control unit 62 compares the amount of the voltage level of each channel detected in the voltage level detection section 64 and supplies the channel changing signal of next time to the changing circuit 58 so that channels are selected in the order of the larger voltage level at next time.

Consequently, at selection state of channels, since the voltage level of each channel is selected in the order of larger voltage level obtained in the prescribed time, such state can be avoided that the voltage level of channel changed and selected at first is too small or the voltage level of the channel is substantially zero, and effects are in that timing of the A/D conversion in the time division output voltage is stabilized, that decision of the channel voltage and the noise voltage becomes easy, and that the relative angle data outputted from the signal processing unit 60 can be made normally correct.

What is claimed is:

1. A relative angle detecting device, comprising:
   a light receiving section for detecting light from a light source, the light receiving section generating a plurality of received light outputs;
   switch means for time-division switching and individual sequential selection of the received light outputs from a plurality of reception elements;
   detecting means for detecting the received light outputs received from said switch; and
   a CPU for calculating a relative position between said light source and said light receiving section from the individual received light outputs detected by said detecting means;
   wherein detection of each of received light outputs from the light receiving section is carried out by the detecting means and a common variable gain amplifier,
   wherein said CPU adds each of the received light outputs, and
   wherein the amount of received light from said light source is controlled in accordance with the added value,
   wherein the detecting means for detecting each of the received light outputs received from said switch comprises a common detecting means, and
   wherein the gain of said variable gain amplifier is controlled in accordance with a detection timing at said detecting means for each of the received light outputs.

2. A relative angle detecting device, comprising:
   a single light receiving section composed of a plurality of light receiving elements for detecting light from a light source;
   a switch means for changing each of received light outputs from said plurality of light receiving elements and selecting one received light output in a time-sharing manner;
   a wave form shaping means for shaping a wave-form of received light output outputted from said switch means and generating a reference signal; and
   a CPU for calculating a relative position between said light source and said light receiving section;
   wherein said CPU sets a detecting timing for a peak value of said received light output in reference to said reference signal, detects a peak value of said received light output and performs said calculation on the basis of the peak value and concurrently outputs a timing signal for controlling a changing-over of said switch means.

3. A relative angle detecting device as set forth in claim 2, wherein said light receiving section is installed in an input device with its direction variable, and a reference light from said light source installed in a device body having a screen is received by said light receiving section and the received light outputs from each light receiving section are operated in said CPU,
   whereby information regarding the direction of said input device with respect to the screen of the device body is calculated.

4. A relative angle detecting device as set forth in claim 2, wherein detecting means and arithmetic means are included in said CPU, and respective operations are executed by software.

5. A relative angle detecting device as set forth in claim 2, wherein said switch means and arithmetic means are included in said CPU, and respective operations are executed by software.

* * * * *

UNITED STATES PATENT AND TRADEMARK OFFICE
CERTIFICATE OF CORRECTION

PATENT NO. : 6,028,592
DATED : February 22, 2000
INVENTOR(S) : Yuichi Umeda et al.

It is certified that error appears in the above-identified patent and that said Letters Patent is hereby corrected as shown below:

Title page,
Line 2, under Foreign Application Priority Data, delete "Oct. 8, 1994" and substitute -- December 8, 1994 -- in its place.

Signed and Sealed this

Twelfth Day of March, 2002

Attest:

Attesting Officer

JAMES E. ROGAN
Director of the United States Patent and Trademark Office